(12) United States Patent
Gould et al.

(10) Patent No.: US 11,095,604 B1
(45) Date of Patent: Aug. 17, 2021

(54) MULTIPLE PROVISIONING OBJECT OPERATION

(71) Applicant: VERISIGN, INC., Reston, VA (US)

(72) Inventors: James F. Gould, Leesburg, VA (US); Srikanth Veeramachaneni, South Riding, VA (US); Nagesh Chigurupati, Aldie, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 16/261,625

(22) Filed: Jan. 30, 2019

Related U.S. Application Data

(63) Continuation of application No. 14/537,597, filed on Nov. 10, 2014, now Pat. No. 10,237,231.

(60) Provisional application No. 61/903,219, filed on Nov. 12, 2013.

(51) Int. Cl.
  *H04L 29/12* (2006.01)

(52) U.S. Cl.
  CPC .............................. *H04L 61/1511* (2013.01)

(58) Field of Classification Search
  None
  See application file for complete search history.

(56) References Cited

U.S. PATENT DOCUMENTS

| | | |
|---|---|---|
| 6,446,133 B1 | 9/2002 | Tan et al. |
| 6,880,007 B1 | 4/2005 | Gardos et al. |
| 6,895,430 B1 | 5/2005 | Schneider |
| 6,901,436 B1 | 5/2005 | Schneider |
| 6,973,505 B1 | 12/2005 | Schneider |

(Continued)

FOREIGN PATENT DOCUMENTS

| | | |
|---|---|---|
| CN | 101444072 A | 5/2009 |
| EP | 2658218 A1 | 10/2013 |

(Continued)

OTHER PUBLICATIONS

Martinelli et al. 'The EPP server of the .it Registry: main features and functionalities', Istituto di Informatica e Telematica, Apr. 2010 [retrieved on Aug. 31, 2020], Retrieved from the Internet: <URL:https://core.ac.uk/download/pdf/37831876.pdf>. (Year: 2010).*

(Continued)

*Primary Examiner* — Kevin T Bates
*Assistant Examiner* — Dae Kim
(74) *Attorney, Agent, or Firm* — MH2 Technology Law Group, LLP

(57) ABSTRACT

A computer-implemented method, computer-readable medium, and an apparatus operable to perform the method is provided for managing multiple provisioned domain name system ("DNS") registry objects. The method can include receiving, at a DNS registry, a multiple domain extensible provisioning protocol ("EPP") command from a registrar on behalf of a registrant to perform an action for each provisioned DNS registry object of the multiple provisioned DNS registry objects; comparing the action with one or more allowable actions in a policy maintained by the registry; determining, by a processor, that the action is allowable based on the comparing; and performing, based on the determining, the action on each of the provisioned DNS registry objects in one transaction.

20 Claims, 3 Drawing Sheets

(56) References Cited

U.S. PATENT DOCUMENTS

| | | | |
|---|---|---|---|
| 6,980,990 | B2 | 12/2005 | Fellman |
| 7,188,138 | B1 | 3/2007 | Schneider |
| 7,194,552 | B1 | 3/2007 | Schneider |
| 7,299,299 | B2 | 11/2007 | Hollenbeck et al. |
| 7,565,402 | B2 | 7/2009 | Schneider |
| 7,797,413 | B2 | 9/2010 | Adelman et al. |
| 7,861,286 | B2 | 12/2010 | M'Raihi et al. |
| 8,037,168 | B2 | 10/2011 | Schneider |
| 8,224,994 | B1 | 7/2012 | Schneider |
| RE43,690 | E | 9/2012 | Schneider et al. |
| 8,370,217 | B1 | 2/2013 | Parsons et al. |
| RE44,207 | E | 5/2013 | Schneider |
| 8,458,161 | B2 | 6/2013 | Schneider |
| 8,612,565 | B2 | 12/2013 | Schneider |
| 8,635,340 | B1 | 1/2014 | Schneider |
| 8,719,900 | B2 | 5/2014 | MacCarthaigh |
| 8,819,795 | B2 | 8/2014 | Hitchcock et al. |
| 10,237,231 | B2 | 3/2019 | Gould et al. |
| 2002/0091703 | A1 | 7/2002 | Bayles |
| 2004/0172463 | A1 | 9/2004 | King et al. |
| 2004/0199493 | A1 | 10/2004 | Ruiz et al. |
| 2005/0102354 | A1 | 5/2005 | Hollenbeck et al. |
| 2006/0253456 | A1 | 11/2006 | Pacholec et al. |
| 2007/0271393 | A1 | 11/2007 | Wong |
| 2008/0016233 | A1 | 1/2008 | Schneider |
| 2008/0059607 | A1 | 3/2008 | Schneider |
| 2009/0327098 | A1 | 12/2009 | Ronen et al. |
| 2010/0036725 | A1 | 2/2010 | Turakhia |
| 2010/0325723 | A1 | 12/2010 | Essawi et al. |
| 2012/0173685 | A1 | 7/2012 | Shorter et al. |
| 2013/0080341 | A1* | 3/2013 | Veeramachaneni ............ G06Q 50/184 705/310 |
| 2014/0189498 | A1 | 7/2014 | Bushlack et al. |
| 2020/0160468 | A1 | 5/2020 | Veeramachaneni et al. |

FOREIGN PATENT DOCUMENTS

| | | |
|---|---|---|
| WO | 2001011443 A2 | 2/2001 |
| WO | 2004015547 A2 | 2/2004 |

OTHER PUBLICATIONS

"Registry/Registrar Documentation for the .barcelona TLD", CORE Internet Council of Registrars, Aug. 28, 2013 [retrieved on Aug. 31, 2020], Retrieved from the Internet: <URL: https://web.archive.org/web/20140611082330/http://corenic.org/files/CORERSDocumentationBarcelona.pdf>. (Year: 2013).*

"Registry/Registrar Documentation for the .barcelona TLD", Core Internet Council of Registrars, Aug. 28, 2013 [retrieved on Feb. 15, 2017]. Retrieved from the Internet: <URL:http://corenic.org/files/CORERSDocumentationBARCELONA.pdf>, pp. 1-51.

Manley, D. "Helpful Howto for EPP registrars", Sourceforge.net, Sep. 28, 2001 [retrieved on Jan. 30, 2017]. Retrieved from the Internet: <URL:http://epp-rtk.sourceforge.net/epp-howto.html>, pp. 1-20.

"TACACS and VTY", The Cisco Learning Network, Nov. 20, 2011 [retreieved on Feb. 14, 2017]. Retrieved from the Internet: <URL:https://learningnetwork.cisco.com/thread/36861>,pp. 1-9.

"RFC 5732—Extensible Provisioning Protocol (EPP) Host Mapping", Aug. 2009 [Retrieved on Feb. 14, 2017]. Retrieved from the Internet: <URL:https://tools.ietf_org/html/rfc5732>, pp. 1-29.

Mitchell, J. et al. "Domain Name Variant Extension Mapping for the Extensible Provisioning Protocol (EPP)", AusRegistry, Dec. 2012 [retrieved on Feb. 14, 2017]. Retrieved from the Internet: <URL:http://ausregistry.github.io/doc/variant-1.1/variant-1.1.txt>, pp. 1-11.

Gould, J. "IDN Language Tag for the Extensible Provisioning Protocol (EPP)", Verisign Inc., Dec. 10, 2013 [retrieved on Feb. 15, 2017]. Retrieved from the Internet: <URL:http://www.verisign.com/assets/epp-sdk/verisign_epp-extension_idn--lang_v00.html>, pp. 1-5.

Gould, J. et al. "Related Domain Extension for the Extensible Provisioning Protocol (EPP)", Verisign Inc., Jan. 2, 2014 [retrieved on Feb. 15, 2017]. Retrieved from the Internet: <URL:http://www.verisign.com/assets/epp-sdk/verisign_epp-extension_rel-ated-domain_v00.html>., 1-20.

Martinelli et al. 'The EPP server of the .it Registry: main features and functionalities', Istituto di Informatica e Telematica, Apr. 2010 [retrieved on Mar. 5, 2018]. Retrieved from the Internet: <URL:https://core.ac.uk/download/pdf/37831876.pdf>, pp. 1-109.

Author Unknown, "Medium Enterprise Design Profile (MEDP)—Network Security Design", Medium Enterprise Design Profile Reference Guide, http://www.3c3cc.com/c/en/us/td/docs/solutions/Enterprise/Medium_Enterprise_Design_Profile/MEDP/chap5.pdf, pp. 1-98.

Chinese Office Action issued in corresponding Chinese Patent Application No. 201410848610.7 dated Aug. 30, 2018.

Extended European Search Report dated Mar. 10, 2015, European Application No. 14192697.2 filed Nov. 11, 2014, pp. 1-6.

SSL Shopper, SSl Certificate: Why Verify Domain Ownership, https://www.sslshopper.com/article-ssl-certificate-why-verify-domain-ownership.html, dated Dec. 16 2007, pp. 1-3 (Year: 2007).

Notice of Allowance issued in corresponding U.S. Appl. No. 13/626,455 dated Sep. 25, 2019, pp. 1-11.

Hollenbeck, S., "ConsoliDate Mapping for the Extensible Provisioning Protocol", VerisignNaming and Directory Services, Mar. 22, 2005, 10 pages.

"New EPP regulations now in effect" http://www.moniker.com/news/vol6/v6art5.jsp 2 pages, Jan. 10, 2007, retrieved from Internet ARchive Wayback Machine https://web.archive.org/web/2007011022202/http://www.moniker.com/news/vol6/v6art5.jsp on Jun. 29, 2015.

Author Unknown, "EPP Extensions for the .coop TLD Registrant Verification", Internet Article, Oct. 5, 2010, htpp://www.nic.coop/media/1517/EppExtensionsForDotCoop.pdf, accessed Sep. 11, 2013, pp. 1-16.

Wikipedia, "Extensible Provisioning Protocol", Internet Article, Jul. 15, 2011, http://en.wikipedia.org/w/index.phptitle=Extensible_Provisioning_Protocol oldid=439639435, accessed Sep. 11, 2013, pp. 1-2.

Wikipedia, "Transfer secret", Internet Article, Aug. 29, 2011, http://en.wikipedia.org/w/index.phptitle=Transfer_secret oldid=447393192, accessed Sep. 11, 2013, pp. 1-2.

* cited by examiner

MULTIPLE PROVISIONING OBJECT OPERATION

CROSS-REFERENCE TO RELATED APPLICATIONS

This application claims the benefit of priority to Ser. No. 14/537,597, filed Nov. 10, 2014, which claims the benefit of priority to U.S. Provisional Patent Application No. 61/903,219, filed Nov. 12, 2013, the contents of which are all incorporated by reference in their entireties. This application is related to U.S. patent application Ser. No. 13/626,455, filed Sep. 25, 2012, which claims priority to U.S. Provisional Patent Application No. 61/539,265, filed Sep. 26, 2011, the contents of which are all incorporated by reference in their entireties.

BACKGROUND

As Internet usage grows exponentially, the demand for Internet-related services is also growing rapidly. As a result of the increased usage of the Internet, the demand for domain names is also growing rapidly. Consequently, demand for domain related services is also on the rise. Such domain related services can include domain name creation, domain name registration renewal, and the like. Typically, a website serves as a primary vehicle for establishing an online presence for a domain name. To meet this ever increasing demand for domain name related services, it is necessary that the entities that provide these services do so in an efficient and cost-effective manner.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com. Each domain name includes one or more characters (labels), each of which may either be an ASCII character or a language-specific character (e.g., Arabic, Chinese, Hindi, and Latin letters with diacritics (e.g., e)). Domain names represented, in whole or in part, by language-specific characters are called Internationalized Domain Names (IDNs). While not yet available, potential IDN versions of well-known TLDs, such as ".com," ".net," and ".org." could also be created (e.g. ".nét").

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and for operating its top-level domain.

For most TLDs, in order to obtain a domain name, that domain name has to be registered with a registry through a domain name registrar, an entity authorized to register Internet domain names on behalf end-users. Alternatively, an end-user can register a domain name indirectly through one or more layers of resellers. A registry may receive registrations from hundreds of registrars.

A registrar usually has a dedicated service connection with the registries in order to access domain related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over Transmission Control Protocol ("TCP").

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data, such as the IPv4 address for A records. Comments can be included by using a semi-colon and tines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows for users to be directed to a desired domain by a lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

Conventionally, EPP is used to by the registrar to request the registry perform a single action for a single provisioned DNS registry object for a registrant. If one or more actions are required for numerous provisioned DNS registry objects, then the EPP command process can unnecessarily burden the registrar or the registry with these numerous command requests. What is needed is an improved technique whereby multiple provisioned DNS registry objects can be managed together in a single operation.

SUMMARY

A computer-implemented method for managing multiple provisioned domain name system ("DNS") registry objects is disclosed. The method can comprise receiving, at a DNS registry, a multiple domain extensible provisioning protocol ("EPP") command from a registrar on behalf of a registrant to perform an action for each provisioned DNS registry object of the multiple provisioned DNS registry objects; comparing the action with one or more allowable actions in a policy maintained by the registry; determining, by a processor, that the action is allowable based on the comparing; and performing, based on the determining, the action on each of the provisioned DNS registry objects in one transaction.

The multiple domain EPP command can comprise one or more of: a multiple domain create operation to create an instance of each DNS registry object, a multiple domain transfer operation to manage sponsorship changes of each DNS registry object, a multiple domain renew operation to extend a validity period of each DNS registry object, a multiple domain update operation to change information associated with each DNS registry object, and a multiple domain delete operation to delete an instance of each DNS registry object. The multiple domain EPP command can comprises one or more of a new operation based on extending an existing operation.

Each provisioned DNS registry object of the multiple DNS registry objects can comprise a domain name, hosts, or contacts.

The method can further comprise determining, by a processor, that the action is not allowable based on the comparing and providing a notification that the action is not allowable to the registrar.

A first provisioned DNS registry object of the multiple provisioned DNS registry objects can have a relationship with a second provisioned DNS registry object of the multiple provisioned DNS registry objects. The relationship can be an international language version of a provisioned DNS registry object. The relationship can be an international language version of a top-level domain. The relationship can be a similarity in a character string in the first and the second provisioned DNS registry object. The relationship can include where a top-level domain of a first provisioned DNS registry object of the multiple provisioned DNS registry objects and a top-level domain of a second provisioned DNS registry object of the multiple provisioned DNS registry objects can be the same or different. The top-level domain of the second provisioned DNS registry object of the multiple provisioned DNS registry objects can be an international language version of the top-level domain of a first provisioned DNS registry object of the multiple provisioned DNS registry objects.

The policy can comprises one or more of: domain name system security extensions (DNSSEC)-related policy, top level domain launch policy, redemption grace period policy, or domain lifecycle policy.

A non-transitory computer-readable storage medium having instructions which, when executed on a processor, perform a method for managing multiple provisioned domain name system ("DNS") registry objects is disclosed.

The method can comprise receiving, at a DNS registry, a multiple domain extensible provisioning protocol ("EPP") command from a registrar on behalf of a registrant to perform an action for each provisioned DNS registry object of the multiple provisioned DNS registry objects; comparing the action with one or more allowable actions in a policy maintained by the registry; determining, by a processor, that the action is allowable based on the comparing; and performing, based on the determining, the action on each of the provisioned DNS registry objects in one transaction.

An apparatus is disclosed that comprises a processor and a memory communicatively coupled to the processor, the memory storing instructions which, when executed on the processor, perform a method for managing multiple provisioned domain name system ("DNS") registry objects, the method comprising receiving, at a DNS registry, a multiple domain extensible provisioning protocol ("EPP") command from a registrar on behalf of a registrant to perform an action for each provisioned DNS registry object of the multiple provisioned DNS registry objects; comparing the action with one or more allowable actions in a policy maintained by the registry; determining, by a processor, that the action is allowable based on the comparing; and performing, based on the determining, the action on each of the provisioned DNS registry objects in one transaction.

DETAILED DESCRIPTION

Figure 1:
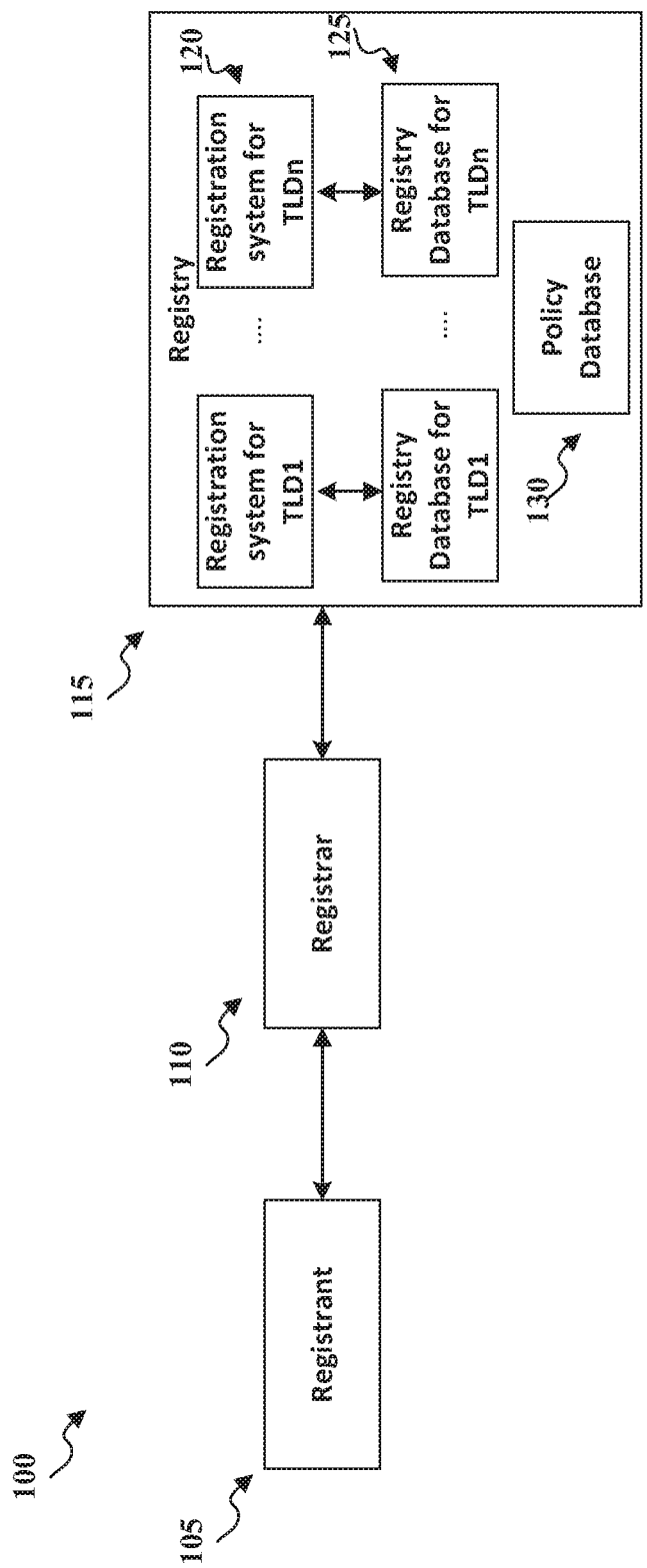
FIG. 1 illustrates an example DNS system that is consistent with implementations of the present disclosure.

Although EPP is widely adopted by many registries, the term "provisioned objects," "provisioning objects," "provisioned DNS registry object," or any similar variant thereof as these terms are used herein, should be understood to include the provisioned objects as described in the standards that define EPP (or [EPP-D] as used below). Examples of standard "provisioning objects" include domain names in RFC 5731, host names in RFC 5732, and contacts in RFC 5733. A "provisioning object" includes the standard EPP objects as existing or yet-to-be-developed objects following the EPP standard.

In accordance with implementations consistent with the present teachings, multiple provisioned DNS registry objects, such as, but are not limited to, domains, hosts, and contacts, can be managed in a single (atomic) operation by the registry. The operation can be invoked over a provisioning protocol, e.g., the Extensible Provisioning Protocol (EPP) or can be invoked using other interfaces, e.g., a web user interface (UI). A provisioning system for a Domain Registry is disclosed that is operable to manage a provisioned DNS registry object at a time based on IETF RFC 5730-5733 with the transform operations of create, update, delete, renew, and transfer. This provisioning system can provide the ability to transform more than one provisioning object at a time by extending the single provisioning object operations, where some attributes are common across the set of provisioning objects and some attributes are specific to each provisioning object. The example provisioning system can allow for the definition of both server-side and client-side related objects and can provide the flexibility to manage both server-side and client-side defined related provisioned DNS registry objects. For example, a client can relate FOO.TLD and BAR.TLD domain names by creating them in a multiple domain create operation and can continue to manage them together with multiple domain operations update, renew, transfer, and delete. A server, in accordance with the present teachings, can define a relationship between domain names and either support as an option or as a requirement to manage the domain names with multiple domain operations. A similar approach can be taken in managing a set of other provisioning objects like hosts and contacts.

In some implementations, the ability to create, update, delete, renew, and transfer (request, cancel, approve, reject) multiple provisioned DNS registry objects, i.e., domain names in a single operation is disclosed. The provisioned DNS registry objects, i.e., domain names, do not require any server-side defined relationship. In some implementations, attributes that are shared can be defined. For example, the names servers and contact passed in a multiple domain create operation can be shared across the set of domain names, but the attributes, such as the auth-info (secret password) and registration period are not shared. A similar approach can be taken with other object types like hosts and contacts. A client-side domain name relationship can be managed by using the extension to the transform commands that enable transforming multiple provisioned DNS registry objects in a single transform command. A server-side domain name relationship (across top-level domains "tld" or variants within a top-level domain) is reflected in the extension to the info response, and can be managed by using the extension to the transform commands.

FIG. 1 illustrates an exemplary system 100 for carrying out the methods disclosed herein. A Registrant 105 communicates with a Registrar 110, requesting to perform an action with a provisioned DNS registry object. Registrar 110, in turn, communicates with a Registry 115 that administers the specified TLD, for example, the .com TLD. Registry 115 includes one or more registration systems 120 for the TLDs it administers. Registry 115 also includes one or more registry databases 125, each corresponding to one of the TLDs Registry 115 administers, for storing and maintaining information regarding the domain name. Registry 115 can also include a policy database 130 that store one or more policies to be used by the Registry 115 to determine whether or nor particular actions are permissible based on, for example, one or more of: the Registrar 110, the Registrant 105, or the action requested for the provisioned DNS registry objects. Alternatively, the Registry 115 may comprise a single database that could include both a registry database for multiple TLDs and a policy database.

Figure 2:
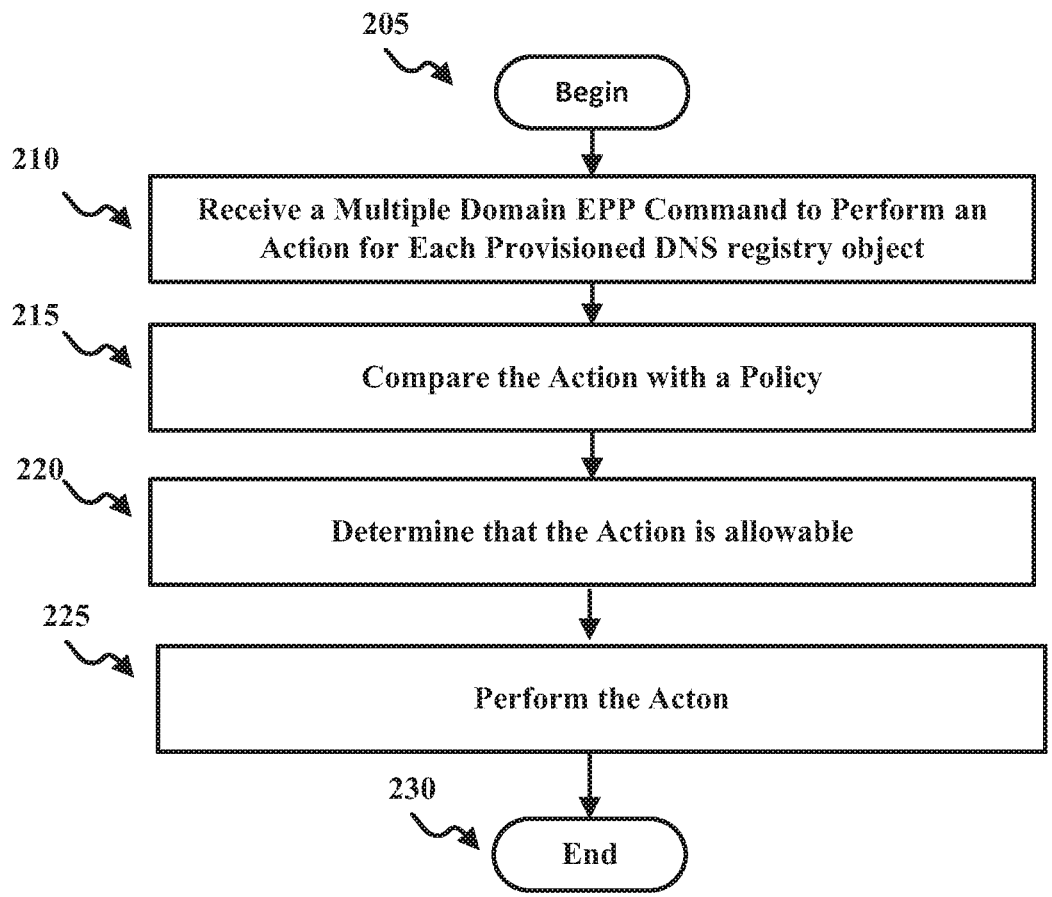
FIG. 2 illustrates an example method for managing multiple provisioned domain name system ("DNS") registry objects that is consistent with implementations of the present disclosure.

FIG. 2 illustrates an example computer-implemented method 200 for managing multiple provisioned domain name system ("DNS") registry objects that is consistent with implementations of the present disclosure. The method 200 can begin at 205. At 210, the DNS registry 115 can receive a multiple domain extensible provisioning protocol ("EPP") command from the registrar 110 on behalf of the registrant 105 to perform an action for each provisioned DNS registry object of the multiple provisioned DNS registry objects.

The action requested in the multiple domain EPP command, which is more fully described below, can comprise one or more of: a multiple domain create operation to create an instance of each DNS registry object, a multiple domain transfer operation to manage sponsorship changes of each DNS registry object, a multiple domain renew operation to extend a validity period of each DNS registry object, a multiple domain update operation to change information associated with each DNS registry object, and a multiple domain delete operation to delete an instance of each DNS registry object. Examples of the provisioned DNS registry objects can include, but are not limited to, a domain name, hosts, or contacts.

In some examples, the multiple domain EPP command can be used for new types of commands. In EPP, a new type of command, or verb, can be created by extending an empty or near empty existing command. A sync command can be created by extending an empty update, which can allow for the synchronization of more than one provisioned DNS registry object at a time utilizing the multiple domain operation extension.

In some examples, a first provisioned DNS registry object of the multiple provisioned DNS registry objects can be a variant of or related to a second provisioned DNS registry object of the multiple provisioned DNS registry objects. The variant can be an international language version of a provisioned DNS registry object. For example, a first provisioned DNS registry object can be example.com and the second provisioned DNS registry object can be internationalized version of example.com. The variant can be an international language version of a top-level domain. For example, a first provisioned DNS registry object can be example.com and the second provisioned DNS registry object can be internationalized version of the .com TLD. The variant can be a similarity in a character string in the first and the second provisioned DNS registry object. For example, a first provisioned DNS registry object can be example.com and the second provisioned DNS registry object can be example1.com. The variant can be where a top-level domain of a first provisioned DNS registry object of the multiple provisioned DNS registry objects and a top-level domain of a second provisioned DNS registry object of the multiple provisioned DNS registry objects are the same or different.

By way of another example, there can be multiple forms of relationships on the server side including, but are not limited to, internationalized domain name ("IDN") variants within a TLD, for example, domain.tld and vardomain.tld, the same domain name label across related TLD's, for example, domain.tld and domain.tld2, the same domain label across IDN variant TLD's, for example, domain.tld and domain.vartld, and IDN variants across related TLD's, for example, domain.tld and vardomain.tld2 or vardomain.vartld.

In yet another example, the TLD's don't have to be IDN variants of each other to have them related. The Registry 115 could relate .foo and .bar if there is a business relationship between the two. The Registry 115 could actually relate second level domains that act like TLD', where third level domains are created under the related second level domains (e.g. domain.com.tld and domain.net.tld). The Registry 115 could support registration of domains under any level and those parent domains could be related.

At 215, a comparison can be performed for the action with one or more allowable actions in a policy maintained by the registry. For example, upon receiving the multiple domain EPP command from the Registrar 110, the Registry 115 may query the policy database 130. The policy database 130 may contain a plurality of policies that include permissible actions allowable for the Registrar 110, the Registrant 105, or the provisioned DNS registry objects on which the Registrar 110 has request the action identified by the multiple domain EPP command. Other policies can include, but are not limited to, domain name system security extensions ("DNSSEC")-related policies, TLD launch policy, redemption grace period policy, or domain lifecycle policy. For example, a policy may operate at an object level, such that each provisioned DNS registry object listed in the multiple domain EPP command is compared against the policy to determine whether the action (i.e., create, delete, renew, transfer) is permissible. Alternatively or additionally, a policy may operate at a specific command level, such that the particular action is compared against the policy to determine if that action is permissible.

At 220, a determination can be made that the action is allowable based on the comparing. If the result of the determination is that the action is not allowable, the registry 115 can ignore the command or can provide an indication that the command is not allowable to the registrar 110. In some examples, the Registry 115 can include reasons and suggested recourse for the registrar to take with the indication that the command is not allowable. In some examples, the registry 115 may determine, based on a prior-established relationship between provisioned DNS registry objects, that one of the provisioned DNS registry object listed in the multiple domain EPP command is associated with another provisioned DNS registry object not listed in the multiple domain EPP command. Based on this prior-established relationship, the Registry 115 may not permit the action for the provisioned DNS registry object listed in the multiple domain EPP command to occur. By way of example, consider the situation that foo.com and bar.com have a previous-established relationship, such that whatever change occurs to foo.com happens to bar.com. Now consider that the multiple domain EPP command includes an action to be performed for both foo.com and example.com. Since the multiple domain EPP command did not include bar.com, the Registry can deny the action in the multiple domain EPP command.

At 225, the registry can then perform the action, if allowable, on each of the provisioned DNS registry objects in one (single) transaction. At 230, the method can end.

The examples below related to the multiple domain EPP command are non-limiting, and provide one illustrate example of the multiple domain EPP structure that can be used in the present disclosure.

EPP <info> Command. This extension defines additional elements for the EPP <info> command described in [EPP-D]. There are two forms of the extension to the EPP <info> command based on the "type" attribute: The Domain Info Form and the Related Info Form.

<relDom:infData> Element

The <relDom:infData> element is returned to a successfully processed <info> command for both the Domain Info Form, described in section [0036], and the Related Info Form, described in section [0047]. The <relDom:infData> element contains the following child elements:

<relDom:group>—One or more <relDom:group> elements describing the group of related domains currently associated with the object. The <relDomain:group> element can contain a "type" attribute that defines the type of the related domains with the possible values of "tld" and "variant". The "tld" type represents a set of related domains across Top Level Domains (TLDs) and the "variant" type represents a set of related variant domains within a TLD. The <relDom:group> element contains the following child elements:

<relDom:fields>—Element containing the set of fields that can be synchronized across the related domains. The <relDom:fields> element can contain an "inSync" boolean attribute that defines whether all of the fields are synchronized. The <relDom:fields> elements contains the following child elements:

<relDom:field>—One or more elements that can be the same across all of the related domains. The <relDom:field> element can contain a "name" attribute that defines the name of the field and an "inSync" boolean attribute that defines the field is synchronized across all of the related domains.

<relDom:registered>—An optional element containing one or more <relDom:name> elements specifying the related domains that are registered.

<relDom:available>—An optional element containing one or more <relDom:name> elements specifying the related domains that are available for registration.

Domain Info Form. The Domain Info Form, defined with the <relDom:info> "type" attribute value of "domain", is used to get the domain information of an existing domain along with the related domain information. This is the default form when the <relDom:info> "type" attribute is not explicitly defined. With the Domain Info Form, in addition to the EPP info command elements described in [EPP-D], the command can contain an <extension> element. The <extension> element can contain a child <relDom:info> element, with the "type" attribute value of "domain" explicitly or by default, to indicate to the server to include the related domain information in an extension to the EPP info response described in [EPP-D].

Example <info> command for a domain with the <relDom:info> extension using the Domain Info Form:

```
<?xml version="1.0" encoding="UTF-8" standalone="no"?>
<epp xmlns="urn:ietf:params:xml:ns:epp-1.0">
  <command>
    <info>
      <domain:info
        xmlns:domain=" urn:ietf:params:xml:ns:domain-1.0">
        <domain:name> xn—test.tld1</domain:name>
      </domain:info>
    </info>
    <extension>
      <relDom:info
        xmlns:relDom=http://www.verisign.com/epp/relatedDomain-1.0 type="domain"/>
    </extension>
    <cITRID> ABC-12345</cITRID>
  </command>
</epp>
```

When an <info> command has been processed successfully, the EPP <resData> element can contain child elements as described in [EPP-D]. In addition, the EPP <extension> element can contain a child <relDom:infData> element that identifies the extension namespace if the object has one or more related domains associated with it and based on server policy. The <relDom:infData> element contains the child elements defined above.

Example <info> response for a domain with both "tld" and "variant" related domain information using the Domain Info Form:

```
<?xml version="1.0" encoding="UTF-8" standalone="no"?>
<epp xmlns="urn:ietf:params:xml:ns:epp-1.0">
  <response>
    <result code="1000">
      <msg> Command completed successfully</msg>
    </result>
    <resData>
      <domain:infData xmlns:domain="urn:ietf:params:xml:ns:domain-1.0">
        <domain:name> xn—test.tld1</domain:name>
```

```
<domain:roid> TEST1-REP</domain:roid>
<domain:status s="ok"/>
<domain:registrant> sh8013</domain:registrant>
<domain:contact type="admin"> sh8013</domain:contact>
<domain:contact type="tech"> sh8013</domain:contact>
<domain:contact type="billing"> sh8013</domain:contact>
<domain:ns>
  <domain:hostObj> ns1.example.com</domain:hostObj>
  <domain:hostObj> ns2.example.com</domain:hostObj>
</domain:ns>
<domain:host> ns1.example.com</domain:host>
<domain:host> ns2.example.com</domain:host>
<domain:clID> ClientX</domain:clID>
<domain:crID> ClientY</domain:crID>
<domain:crDate>1999-04-03T22:00:00.0Z</domain:crDate>
<domain:upID> ClientX</domain:upID>
<domain:upDate>1999-12-03T09:00:00.0Z</domain:upDate>
<domain:exDate>2005-04-03T22:00:00.0Z</domain:exDate>
<domain:trDate>2000-04-08T09:00:00.0Z</domain:trDate>
<domain:authInfo>
  <domain:pw>2fooBAR</domain:pw>
</domain:authInfo>
</domain:infData>
</resData>
<extension>
<relDom:infData
  xmlns:relDom="http://www.verisign-grs.com/epp/relatedDomain-1.0">
  <relDom:group type="tld">
    <relDom:fields inSync="false">
      <relDom:field name="clID" inSync="false">
      <relDom:field name="registrant" inSync="true">
      <relDom:field name="ns" inSync="false">
    </relDom:fields>
    <relDom:registered>
      <relDom:name> xn—test.tld1</relDom:name>
      <relDom:name> xn—test.tld2</relDom:name>
    </relDom:registered>
    <relDom:available>
      <relDom:name> xn—test.tld3</relDom:name>
    </relDom:available>
  </relDom:group>
  <relDom:group type="variant">
    <relDom:fields inSync="true">
      <relDom:field name="clID" inSync="true">
      <relDom:field name="registrant" inSync="true">
      <relDom:field name="ns" inSync="true">
    </relDom:fields>
    <relDom:registered>
      <relDom:name> xn—test-variant1.tld1</relDom:name>
      <relDom:name> xn—test-variant2.tld1</relDom:name>
      <relDom:name> xn—test-variant3.tld1</relDom:name>
    </relDom:registered>
    <relDom:available>
      <relDom:name> xn—test-variant4.tld1</relDom:name>
      <relDom:name> xn—test-variant5.tld1</relDom:name>
      <relDom:name> xn—test-variant6.tld1</relDom:name>
    </relDom:available>
  </relDom:group>
</relDom:infData>
</extension>
<trID>
  <clTRID> ABC-12345</clTRID>
  <svTRID>54322-XYZ</svTRID>
</trID>
</response>
</epp>
```

Related Info Form. The Related Info Form, defined with the <relDom:info>"type" attribute value of "related", is a new command called the Related Domain Info Command. The command gets the related domain information of the <domain:name> info command element defined in [EPP-D], independent of the existence of the domain name. With the Related Info Form, in addition to the EPP info command elements defined in [EPP-D], the command can contain an <extension> element. The <extension> element can contain a child <relDom:info> element, with the "type" attribute value of "related", to indicate to the server to include the related domain information in an extension to the EPP response described in [EPP].

Example <info> command for a domain with the <relDom:info> extension using the Related Info Form:

```
<?xml version="1.0" encoding="UTF-8" standalone="no"?>
<epp xmlns="urn:ietf:params:xml:ns:epp-1.0">
  <command>
    <info>
      <domain:info
        xmlns:domain="urn:ietf:params:xml:ns:domain-1.0">
        <domain:name> xn—test.tld3</domain:name>
      </domain:info>
    </info>
    <extension>
      <relDom:info
        xmlns:relDom=http://www.verisign.com/epp/relatedDomain-1.0 type="related"/>
    </extension>
    <clTRID> ABC-12345</clTRID>
  </command>
</epp>
```

When an <info> command has been processed successfully, the EPP <response> element can contain an <extension> <relDom:infData> element that identifies the related domain namespace. In addition, the EPP <extension> element can contain a child <relDom:infData> element that identifies the extension namespace if at least one related domain exists and based on server policy. The <relDom:infData> element contains the child elements defined above.

Example <info> response for both "tld" and "variant" related domain information using the Related Info Form:

```
<epp xmlns="urn:ietf:params:xml:ns:epp-1.0>
  <response>
    <result code="1000">
```

```
<msg>Command completed successfully</msg>
 </result>
 <extension>
  <relDom:infData
    xmlns:relDom="http://www.verisign.com/epp/relatedDomain-1.0">
   <relDom:group type="tld">
    <relDom:fields inSync="false">
     <relDom:field name="clID" inSync="false"/>
     <relDom:field name="registrant" inSync="true"/>
     <relDom:field name="ns" inSync="false"/>
    </relDom:fields>
    <relDom:registered>
     <relDom:name>xn--test.tld1</relDom:name>
     <relDom:name>xn--test.tld2</relDom:name>
    </relDom:registered>
    <relDom:available>
     <relDom:name>xn--test.tld3</relDom:name>
    </relDom:available>
   </relDom:group>
   <relDom:group type="variant">
    <relDom:fields inSync="true">
     <relDom:field name="clID" inSync="true"/>
     <relDom:field name="registrant" inSync="true"/>
     <relDom:field name="ns" inSync="true"/>
    </relDom:fields>
    <relDom:registered>
     <relDom:name>xn--test-variant1.tld1</relDom:name>
     <relDom:name>xn--test-variant1.tld2</relDom:name>
     <relDom:name>xn--test-variant1.tld3</relDom:name>
    </relDom:registered>
    <relDom:available>
     <relDom:name>xn--test-variant2.tld1</relDom:name>
     <relDom:name>xn--test-variant2.tld2</relDom:name>
     <relDom:name>xn--test-variant2.tld3</relDom:name>
    </relDom:available>
   </relDom:group>
  </relDom:infData>
 </extension>
 <trID>
  <clTRID>ABC-12345</clTRID>
  <svTRID>54322-XYZ</svTRID>
 </trID>
</response>
</epp>
```

EPP <transfer> Query Command. This extension defines additional elements for the EPP <transfer> command described in [EPP-D]. The extension to the EPP <transfer> query command is defined below where the <transfer> command can contain an "op" attribute with value "query". The extension to the EPP <transfer> query response is defined below.

EPP Transform Commands. EPP provides five commands to transform objects: <create> to create an instance of an object, <delete> to delete an instance of an object, <renew> to extend the validity period of an object, <transfer> to manage object sponsorship changes, and <update> to change information associated with an object.

EPP <create> Command. This extension defines additional elements for the EPP <create> command described in [EPP-D]. In addition to the EPP command elements described in [EPP-D], the command can contain an <extension> element. The <extension> element can contain a child <relDom:create> element to create more than one related domain name in the <create> command. The <relDom:create> element contains the following child elements:

<relDom:domain>—One or more <relDom:domain> elements to create along with the <domain:name> described in [EPP-D]. The <domain:ns>, <domain:registrant>, and <domain:contact> elements in [EPP-D] can be set on the <relDom:domain> objects by the server. The <relDom:domain> element contains the following child elements:

<relDom:name>—Element that contains the fully qualified name of the domain object to be created.

<relDom:authInfo>—Element that contains authorization information to be associated with the domain object as described in [EPP-D].

<relDom:period>—An optional element containing the initial registration period of the domain object as described in [EPP-D]. A server may define a default initial registration period if not specified by the client.

<relDom:lang>—An optional element containing language tag value, as defined in [EPP-ILANG], for an internationalized domain name (IDN).

Example <create> command for three related domain names ("example1.tld", "example2.tld", and "example3.tld") with the <relDom:create> extension:

```
<?xml version="1.0" encoding="UTF-8" standalone="no"?>
<epp xmlns="urn:ietf:params:xml:ns:epp-1.0">
 <command>
  <create>
   <domain:create
      xmlns:domain="urn:ietf:params:xml:ns:domain-1.0">
    <domain:name>example1.tld</domain:name>
     <domain:authInfo>
      <domain:pw>2fooBAR</domain:pw>
     </domain:authInfo>
   </domain:create>
  </create>
  <extension>
   <relDom:create
      xmlns:relDom="http://www.verisign.com/epp/relatedDomain-1.0">
    <relDom:domain>
     <relDom:name>example2.tld</relDom:name>
     <relDom:authInfo>
      <relDom:pw>relDom123!</relDom:pw>
     </relDom:authInfo>
     <relDom:period unit="y">5</relDom:period>
    </relDom:domain>
    <relDom:domain>
     <relDom:name>example3.tld</relDom:name>
     <relDom:authInfo>
      <relDom:pw>relDom456!</relDom:pw>
     </relDom:authInfo>
     <relDom:period unit="y">5</relDom:period>
    </relDom:domain>
   </relDom:create>
  </extension>
  <clTRID>ABC-12345</clTRID>
 </command>
</epp>
```

When an <create> command has been processed successfully, the EPP <resData> element can contain child elements as described in [EPP-D]. In addition, the EPP <extension> element can contain a child <relDom:creData> element. The <relDom:creData> element contains the following child elements:

<relDom:domain>—One or more <relDom:domain> elements created along with the <domain:name> described in [EPP-D]. The <relDom:domain> element contains the following child elements:

<relDom:name>—Element that contains the fully qualified name of the domain object created.

<relDom:crDate>—Element that contains the date and time of domain object creation.

<relDom:exDate>—An optional element that contains the date and time identifying the end of the domain object's registration period.

Example <create> response for three related domain names ("example1.tld", "example2.tld", and "example3.tld") created with the <relDom:create> extension:

```
<?xml version="1.0" encoding="UTF-8" standalone="no"?>
<epp xmlns="urn:ietf:params:xml:ns:epp-1.0">
 <response>
  <result code="1000">
   <msg>Command completed successfully</msg>
  </result>
  <resData>
   <domain:creData
       xmlns:domain="urn:ietf:params:xml:ns:domain-1.0">
    <domain:name>example1.tld</domain:name>
    <domain:crDate>2013-07-10T00:00:00.0000Z</domain:crDate>
    <domain:exDate>2018-07-10T00:00:00.0000Z</domain:exDate>
   </domain:creData>
  </resData>
  <extension>
   <relDom:creData
       xmlns:relDom="http://www.verisign.com/epp/relatedDomain-1.0">
    <relDom:domain>
     <relDom:name>example2.tld</relDom:name>
     <relDom:crDate>2013-07-10T00:00:00.0000Z</relDom:crDate>
     <relDom:exDate>2018-07-10T00:00:00.0000Z</relDom:exDate>
    </relDom:domain>
    <relDom:domain>
     <relDom:name>example3.tld</relDom:name>
     <relDom:crDate>2013-07-10T00:00:00.0000Z</relDom:crDate>
     <relDom:exDate>2018-07-10T00:00:00.0000Z</relDom:exDate>
    </relDom:domain>
   </relDom:creData>
  </extension>
  <trID>
   <clTRID>ABC-12345</clTRID>
   <svTRID>54321-XYZ</svTRID>
  </trID>
 </response>
</epp>
```

EPP <delete> Command

This extension defines additional elements for the EPP <delete> command described in [EPP-D].

In addition to the EPP command elements described in [EPP-D], the command can contain an <extension> element. The <extension> element can contain a child <relDom:delete> element to delete more than one related domain name in the <delete> command. The <relDom:delete> element contains the following child elements:

<relDom:name>—One or more <relDom:name> elements to delete along with the <domain:name> described in [EPP-D].

Example <delete> command for three related domain names ("example1.tld", "example2.tld", and "example3.tld") with the <relDom:delete> extension:

```
<?xml version="1.0" encoding="UTF-8" standalone="no"?>
<epp xmlns="urn:ietf:params:xml:ns:epp-1.0">
 <command>
  <delete>
   <domain:delete xmlns:domain="urn:ietf:params:xml:ns:domain-1.0">
    <domain:name>example1.tld</domain:name>
   </domain:delete>
  </delete>
  <extension>
   <relDom:delete
       xmlns:relDom="http://www.verisign.com/epp/relatedDomain-1.0">
    <relDom:name>example2.tld</relDom:name>
    <relDom:name>example3.tld</relDom:name>
   </relDom:delete>
  </extension>
  <clTRID>ABC-12345</clTRID>
 </command>
</epp>
```

When a <delete> command has been processed successfully, the EPP <resData> element can contain child elements as described in [EPP-D]. In addition, the EPP <extension> element can contain a child <relDom:delData> element. The <relDom:delData> element contains the following child elements:

<relDom:domain>—One or more <relDom:domain> elements containing the result of the delete command. The <relDom:domain> element contains the following child elements:

<relDom:name>—Element that contains the fully qualified name of the domain object.

<relDom:result>—Element that contains the result of the delete with the possible values of "deleted", to indicated that the domain object was immediately deleted, and "pendingDelete", to indicate that the domain object was updated with the "pendingDelete" status.

Example <delete> response for three related domain names ("example1.tld", "example2.tld", and "example3.tld") deleted with the <relDom:delete> extension:

```
<?xml version="1.0" encoding="UTF-8" standalone="no"?>
<epp xmlns="urn:ietf:params:xml:ns:epp-1.0">
 <response>
  <result code="1001">
   <msg>Command completed successfully; action pending</msg>
  </result>
  <extension>
   <relDom:delData
       xmlns:relDom="http://www.verisign.com/epp/relatedDomain-1.0">
    <relDom:domain>
     <relDom:name>domain1.com</relDom:name>
     <relDom:result>deleted</relDom:result>
    </relDom:domain>
    <relDom:domain>
     <relDom:name>domain2.com</relDom:name>
     <relDom:result>pendingDelete</relDom:result>
    </relDom:domain>
   </relDom:delData>
  </extension>
  <trID>
   <clTRID>ABC-12345</clTRID>
   <svTRID>54321-XYZ</svTRID>
  </trID>
 </response>
</epp>
```

EPP <renew> Command

This extension defines additional elements for the EPP <renew> command described in [EPP-D].

In addition to the EPP command elements described in [EPP-D], the command can contain an <extension> element. The <extension> element can contain a child <relDom:renew> element to renew more than one related domain name in the <renew> command. The <relDom:renew> element contains the following child elements:

<relDom:domain>—One or more <relDom:domain> elements to renew along with the <domain:name> described in [EPP-D]. The <relDom:domain> element contains the following child elements:

<relDom:name>—Element that contains the fully qualified name of the domain object to be renewed.

<relDom:curExpDate>—Element that contains the date on which the current validity period ends as described in [EPP-D].

<relDom:period>—An optional element that contains the number of units to be added to the registration period of the domain object as described in [EPP-D]. The number of units available may be subject to limits imposed by the server.

Example <renew> command for three related domain names ("example1.tld", "example2.tld", and "example3.tld") with the <relDom:renew> extension:

```xml
<?xml version="1.0" encoding="UTF-8" standalone="no"?>
<epp xmlns="urn:ietf:params:xml:ns:epp-1.0">
 <command>
  <renew>
   <domain:renew
       xmlns:domain="urn:ietf:params:xml:ns:domain-1.0">
    <domain:name>example1.tld</domain:name>
    <domain:curExpDate>2013-07-10</domain:curExpDate>
    <domain:period unit="y">5</domain:period>
   </domain:renew>
  </renew>
  <extension>
   <relDom:renew
       xmlns:relDom="http://www.verisign.com/epp/relatedDomain-1.0">
    <relDom:domain>
     <relDom:name>example2.tld</relDom:name>
     <relDom:curExpDate>2013-07-10</relDom:curExpDate>
     <relDom:period unit="y">5</relDom:period>
    </relDom:domain>
    <relDom:domain>
     <relDom:name>example3.tld</relDom:name>
     <relDom:curExpDate>2013-07-10</relDom:curExpDate>
     <relDom:period unit="y">5</relDom:period>
    </relDom:domain>
   </relDom:renew>
  </extension>
  <clTRID>ABC-12345</clTRID>
 </command>
</epp>
```

When a <renew> command has been processed successfully, the EPP <resData> element can contain child elements as described in [EPP-D]. In addition, the EPP <extension> element can contain a child <relDom:renData> element. The <relDom:renData> element contains the following child elements:

<relDom:domain>—One or more <relDom:domain> elements renewed along with the <domain:name> described in [EPP-D]. The <relDom:domain> element contains the following child elements:

<relDom:name>—Element that contains the fully qualified name of the domain object renewed.

<relDom:exDate>—An optional element that contains the date and time identifying the end of the domain object's registration period.

Example <renew> response for three related domain names ("example1.tld", "example2.tld", and "example3.tld") renewed with the <relDom:renew> extension:

```xml
<?xml version="1.0" encoding="UTF-8" standalone="no"?>
<epp xmlns="urn:ietf:params:xml:ns:epp-1.0">
 <response>
  <result code="1000">
   <msg>Command completed successfully</msg>
  </result>
  <resData>
   <domain:renData
       xmlns:domain="urn:ietf:params:xml:ns:domain-1.0">
    <domain:name>example1.com</domain:name>
    <domain:exDate>2018-07-10T00:00:00.0000Z</domain:exDate>
   </domain:renData>
  </resData>
  <extension>
   <relDom:renData
       xmlns:relDom="http://www.verisign.com/epp/relatedDomain-1.0">
    <relDom:domain>
     <relDom:name>example2.com</relDom:name>
     <relDom:exDate>2018-07-10T00:00:00.0000Z</relDom:exDate>
    </relDom:domain>
    <relDom:domain>
     <relDom:name>example3.com</relDom:name>
     <relDom:exDate>2018-07-10T00:00:00.0000Z</relDom:exDate>
    </relDom:domain>
   </relDom:renData>
  </extension>
  <trID>
   <clTRID>ABC-12345</clTRID>
   <svTRID>54321-XYZ</svTRID>
  </trID>
 </response>
</epp>
```

EPP <transfer> Command

This extension defines additional elements for the EPP <transfer> command described in [EPP-D]. In addition to the EPP command elements described in [EPP-D], the command can contain an <extension> element. The <extension> element can contain a child <relDom:transfer> element to transfer more than one related domain name in the <transfer> command. The <relDom:transfer> element contains the following child elements:

<relDom:domain>—One or more <relDom:domain> elements to apply the transfer operation to along with the <domain:name> described in [EPP-D]. The <relDom:domain> element contains the following child elements:

<relDom:name>—Element that contains the fully qualified name of the domain object.

<relDom:authInfo>—An optional element that contains authorization information associated with the domain object as described in [EPP-D].

<relDom:period>—An optional element that contains the number of units to be added to the registration period of the domain object as described in [EPP-D]. This element can only be used when a transfer is requested, and it can be ignored if used otherwise. The number of units available may be subject to limits imposed by the server.

Example <transfer> request command for three related domain names ("example1.tld", "example2.tld", and "example3.tld") with the <relDom:transfer> extension:

```xml
<?xml version="1.0" encoding="UTF-8" standalone="no"?>
<epp xmlns="urn:ietf:params:xml:ns:epp-1.0">
 <command>
  <transfer op="request">
   <domain:transfer
       xmlns:domain="urn:ietf:params:xml:ns:domain-1.0">
    <domain:name>example1.tld</domain:name>
    <domain:period unit="y">1</domain:period>
    <domain:authInfo>
     <domain:pw>2fooBAR</domain:pw>
    </domain:authInfo>
   </domain:transfer>
  </transfer>
  <extension>
   <relDom:transfer
       xmlns:relDom="http://www.verisign.com/epp/relatedDomain-1.0">
    <relDom:domain>
     <relDom:name>example2.tld</relDom:name>
     <relDom:authInfo>
      <relDom:pw>relDom123!</relDom:pw>
     </relDom:authInfo>
     <relDom:period unit="y">1</relDom:period>
    </relDom:domain>
    <relDom:domain>
     <relDom:name>example3.tld</relDom:name>
     <relDom:authInfo>
      <relDom:pw>relDom123!</relDom:pw>
     </relDom:authInfo>
    </relDom:domain>
   </relDom:transfer>
  </extension>
  <clTRID>ABC-12345</clTRID>
 </command>
</epp>
```

When a <transfer> command has been processed successfully, the EPP <resData> element can contain child elements as described in [EPP-D]. In addition, the EPP <extension> element can contain a child <relDom:trnData> element. The <relDom:trnData> element contains the following child elements:

<relDom:domain>—One or more <relDom:domain> elements associated with the transfer along with the <domain:name> described in [EPP-D]. The <relDom:domain> element contains the following child elements:

<relDom:name>—Element that contains the fully qualified name of the domain object.

<relDom:trStatus>—Element that contains the state of the most recent transfer request.

<relDom:reID>—Element that contains the identifier of the client that requested the object transfer.

<relDom:reDate>—Element that contains the date and time that the transfer was requested.

<relDom:acID>—Element that contains the identifier of the client that can act upon a pending transfer request. For all other status types, the value identifies the client that took the indicated action.

<relDom:acDate>—Element that contains the date and time of a required or completed request as described in [EPP-D]. For a pending request, the value identifies the date and time by which a response is required before an automated response action will be taken by the server. For all other status types, the value identifies the date and time when the request was completed.

<relDom:exDate>—An optional element that contains the date and time identifying the end of the domain object's registration period.

Example <transfer> response for three related domain names ("example1.tld", "example2.tld", and "example3.tld") transferred with the <relDom:transfer> extension:

```
<?xml version="1.0" encoding="UTF-8" standalone="no"?>
<epp xmlns="urn:ietf:params:xml:ns:epp-1.0">
 <response>
  <result code="1000">
   <msg>Command completed successfully</msg>
  </result>
  <resData>
   <domain:trnData
       xmlns:domain="urn:ietf:params:xml:ns:domain-1.0">
    <domain:name>example1.tld</domain:name>
    <domain:trStatus>pending</domain:trStatus>
    <domain:reID>ClientX</domain:reID>
    <domain:reDate>2013-07-10T00:00:00.0000Z</domain:reDate>
    <domain:acID>ClientY</domain:acID>
    <domain:acDate>2013-07-10T00:00:00.0000Z</domain:acDate>
    <domain:exDate>2014-07-10T00:00:00.0000Z</domain:exDate>
   </domain:trnData>
  </resData>
  <extension>
   <relDom:trnData
       xmlns:relDom="http://www.verisign.com/epp/relatedDomain-1.0">
    <relDom:domain>
     <relDom:name>example2.tld</relDom:name>
     <relDom:trStatus>pending</relDom:trStatus>
     <relDom:reID>ClientX</relDom:reID>
     <relDom:reDate>2013-07-10T00:00:00.0000Z</relDom:reDate>
     <relDom:acID>ClientY</relDom:acID>
     <relDom:acDate>2013-07-10T00:00:00.0000Z</relDom:acDate>
     <relDom:exDate>2014-07-10T00:00:00.0000Z</relDom:exDate>
    </relDom:domain>
    <relDom:domain>
     <relDom:name>example3.tld</relDom:name>
     <relDom:trStatus>pending</relDom:trStatus>
     <relDom:reID>ClientX</relDom:reID>
     <relDom:reDate>2013-07-10T00:00:00.0000Z</relDom:reDate>
     <relDom:acID>ClientY</relDom:acID>
     <relDom:acDate>2013-07-10T00:00:00.0000Z</relDom:acDate>
     <relDom:exDate>2014-07-10T00:00:00.0000Z</relDom:exDate>
    </relDom:domain>
   </relDom:trnData>
  </extension>
  <trID>
   <clTRID>ABC-12345</clTRID>
   <svTRID>54321-XYZ</svTRID>
  </trID>
 </response>
</epp>
```

EPP <update> Command

This extension defines additional elements for the EPP <update> command described in [EPP-D]. In addition to the EPP command elements described in [EPP-D], the command can contain an <extension> element. The <extension> element can contain a child <relDom:update> element to update more than one related domain name in the <update> command. The updates specified in the EPP <update> command described in [EPP-D] can be applied to the domain objects specified in the <relDom:update>. The <relDom:update> element contains the following child elements:

<relDom:name>—One or more <relDom:name> elements to update along with the <domain:name> described in [EPP-D].

Example <update> command for three related domain names ("example1.tld", "example2.tld", and "example3.tld") with the <relDom:update> extension:

```
<?xml version="1.0" encoding="UTF-8" standalone="no"?>
<epp xmlns="urn:ietf:params:xml:ns:epp-1.0">
 <command>
  <update>
   <domain:update
       xmlns:domain="urn:ietf:params:xml:ns:domain-1.0">
    <domain:name>example1.tld</domain:name>
    <domain:add>
     <domain:ns>
      <domain:hostObj>ns1.example.com</domain:hostObj>
     </domain:ns>
     <domain:status s="clientHold"/>
    </domain:add>
    <domain:rem>
     <domain:ns>
      <domain:hostObj>ns2.example.com</domain:hostObj>
     </domain:ns>
     <domain:status s="clientDeleteProhibited"/>
    </domain:rem>
    <domain:chg>
     <domain:registrant>jd1234</domain:registrant>
     <domain:authInfo>
      <domain:pw>2fooBAR</domain:pw>
     </domain:authInfo>
    </domain:chg>
   </domain:update>
  </update>
  <extension>
   <relDom:update
       xmlns:relDom="http://www.verisign.com/epp/relatedDomain-1.0">
    <relDom:name>example2.tld</relDom:name>
    <relDom:name>example3.tld</relDom:name>
   </relDom:update>
  </extension>
  <clTRID>ABC-12345-XYZ</clTRID>
 </command>
</epp>
```

This extension does not define any extension to the response of an <update> domain command. After processing the command, the server replies with a standard EPP response as defined in [EPP-D].

Formal Syntax. An EPP object mapping is specified in XML Schema notation. The formal syntax presented here is a complete schema representation of the object mapping suitable for automated validation of EPP XML instances. The BEGIN and END tags are not part of the schema; they are used to note the beginning and ending of the schema for URI registration purposes.

```
BEGIN
<?xml version="1.0" encoding="UTF-8"?>
<schema xmlns:relDom="http://www.verisign.com/epp/relatedDomain-1.0"
    xmlns="http://www.w3.org/2001/XMLSchema"
    xmlns:eppcom="urn:ietf:params:xml:ns:eppcom-1.0"
    targetNamespace="http://www.verisign.com/epp/relatedDomain-1.0"
    elementFormDefault="qualified">
  <annotation>
    <documentation>
      Extensible Provisioning Protocol v1.0
      Related Domain extension
    </documentation>
  </annotation>
<!--
Import common element types.
-->
<import namespace="urn:ietf:params:xml:ns:eppcom-1.0"
    schemaLocation="eppcom-1.0.xsd"/>
<!--
Related Domain info command extension root element
-->
<element name="info" type="relDom:infoType"/>
<!--
Info type attribute values
-->
<simpleType name="infoTypeType">
  <restriction base="string">
    <enumeration value="domain"/>
    <enumeration value="related"/>
  </restriction>
</simpleType>
<!--
Related Domain Info type
-->
<complexType name="infoType">
  <attribute name="type" type="relDom:infoTypeType"
      default="domain"/>
</complexType>
<!--
Related Domain info response extension root element
-->
<element name="infData" type="relDom:infDataType"/>
<complexType name="infDataType">
  <sequence>
    <element name="group" type="relDom:relatedDomainGroupType"
        maxOccurs="unbounded"/>
  </sequence>
</complexType>
<simpleType name="fieldNameType">
  <restriction base="normalizedString">
    <minLength value="1"/>
    <maxLength value="64"/>
  </restriction>
</simpleType>
<!--
Field that needs to be synchronized.
-->
<complexType name="fieldType">
  <attribute name="name" type="relDom:fieldNameType"
      use="required"/>
  <attribute name="inSync" type="boolean"
      use="required"/>
</complexType>
<!--
Related Domain group types
-->
<simpleType name="groupType">
  <restriction base="string">
    <enumeration value="tld"/>
    <enumeration value="variant"/>
  </restriction>
</simpleType>
<!--
Fields that need to be synchronized
-->
<complexType name="fieldsType">
  <sequence>
    <element name="field" type="relDom:fieldType"
        maxOccurs="unbounded"/>
  </sequence>
  <attribute name="inSync" use="required"/>
</complexType>
<!--
Domain names that are registered or available.
-->
<complexType name="domainListType">
  <sequence>
    <element name="name" type="eppcom:labelType"
        maxOccurs="unbounded"/>
  </sequence>
</complexType>
<!--
Related Domain Group
-->
<complexType name="relatedDomainGroupType">
  <sequence>
    <element name="fields" type="relDom:fieldsType"/>
    <element name="registered" type="relDom:domainListType"
        minOccurs="0"/>
    <element name="available" type="relDom:domainListType"
        minOccurs="0"/>
  </sequence>
  <attribute name="type" type="relDom:groupType"
      use="required"/>
</complexType>
<!--
Related Domain Auth Info Type
-->
<complexType name="authInfoType">
  <choice>
    <element name="pw" type="eppcom:pwAuthInfoType"/>
    <element name="ext" type="eppcom:extAuthInfoType"/>
  </choice>
</complexType>
<!--
Related Domain Period Type
-->
<complexType name="periodType">
  <simpleContent>
    <extension base="relDom:pLimitType">
      <attribute name="unit" type="relDom:pUnitType"
          use="required"/>
    </extension>
  </simpleContent>
</complexType>
<!--
Related Domain Period Limit Type
-->
<simpleType name="pLimitType">
  <restriction base="unsignedShort">
    <minInclusive value="1"/>
    <maxInclusive value="99"/>
  </restriction>
</simpleType>
<!--
Related Domain Period Unit Type
-->
<simpleType name="pUnitType">
  <restriction base="token">
    <enumeration value="y"/>
    <enumeration value="m"/>
  </restriction>
</simpleType>
<!--
Related Domain Create Request Type
-->
<complexType name="createRequestType">
  <sequence>
```

```
    <element name="name" type="eppcom:labelType"/>
    <element name="authInfo" type="relDom:authInfoType"/>
    <element name="period" type="relDom:periodType"
      minOccurs="0"/>
    <element name="lang" type="language"
      minOccurs="0"/>
   </sequence>
  </complexType>
<!--
Related Domain Create Request element
-->
<element name="create">
  <complexType>
   <sequence>
    <element name="domain" type="relDom:createRequestType"
      maxOccurs="unbounded"/>
   </sequence>
  </complexType>
</element>
<!--
Related Domain Create Response type
-->
<complexType name="creDataType"?
  <sequence>
    <element name="name" type="eppcom:labelType"/>
    <element name="crDate" type="dateTime"/>
    <element name="exDate" type="dateTime"
      minOccurs="0"/>
   </sequence>
  </complexType>
<!--
Related Domain Create Request element
-->
<element name="creData"?
  <complexType>
   <sequence>
    <element name="domain" type="relDom:creDataType"
      maxOccurs="unbounded"/>
   </sequence>
  </complexType>
</element>
<!--
Related Domain Delete Request element
-->
<element name="delete" type="relDom:domainListType"/>
<simpleType name="deleteResultType">
   <restriction base="string">
    <enumeration value="deleted"/>
    <enumeration value="pendingDelete"/>
   </restriction>
  </simpleType>
<!--
Related Domain Delete Response type
-->
<complexType name="delDataType">
  <sequence>
    <element name="name" type="eppcom:labelType"/>
    <element name="result" type="relDom:deleteResultType"/>
   </sequence>
  </complexType>
<!--
Related Domain Delete Response element
-->
<element name="delData">
  <complexType>
   <sequence>
    <element name="domain" type="relDom:delDataType"
      maxOccurs="unbounded"/>
   </sequence>
  </complexType>
</element>
<!--
Related Domain Update Request element
-->
<element name="update" type="relDom:domainListType"/>
<!--
Related Domain Renew type
-->
<complexType name="renewType">
  <sequence>
    <element name="name" type="eppcom:labelType"/>
    <element name="curExpDate" type="date"/>
    <element name="period" type="relDom:periodType"
      minOccurs="0"/>
   </sequence>
  </complexType>
<!--
Related Domain Renew element
-->
<element name="renew">
  <complexType>
   <sequence>
    <element name="domain" type="relDom:renewType"
      maxOccurs="unbounded"/>
   </sequence>
  </complexType>
</element>
<!--
Related Domain Renew Data type
-->
<complexType name="renDataType">
  <sequence>
    <element name="name" type="eppcom:labelType"/>
    <element name="exDate" type="dateTime"/>
   </sequence>
  </complexType>
<!--
Related Domain Renew Data element
-->
<element name="renData">
  <complexType>
   <sequence>
    <element name="domain" type="relDom:renDataType"
      maxOccurs="unbounded"/>
   </sequence>
  </complexType>
</element>
<!--
Related Domain Transfer type
-->
<complexType name="transferType">
  <sequence>
    <element name="name" type="eppcom:labelType"/>
    <element name="authInfo" type="relDom:authInfoType"
      minOccurs="0"/>
    <element name="period" type="relDom:periodType"
      minOccurs="0"/>
   </sequence>
  </complexType>
<!--
Related Domain Transfer element
-->
<element name="transfer">
  <complexType>
   <sequence>
    <element name="domain" type="relDom:transferType"
      maxOccurs="unbounded"/>
   </sequence>
  </complexType>
</element>
<!--
Related Domain Transfer Data Type
-->
<complexType name="trnDataType">
  <sequence>
    <element name="name" type="eppcom:labelType"/>
    <element name="trStatus" type="eppcom:trStatusType"/>
    <element name="reID" type="eppcom:clIDType"/>
    <element name="reDate" type="dateTime"/>
    <element name="acID" type="eppcom:clIDType"/>
    <element name="acDate" type="dateTime"/>
    <element name="exDate" type="dateTime" minOccurs="0"/>
   </sequence>
  </complexType>
<!--
Related Domain Transfer Data element
-->
<element name="trnData">
```

```
  <complexType>
    <sequence>
      <element name="domain" type="relDom:trnDataType"
        maxOccurs="unbounded"/>
    </sequence>
  </complexType>
</element>
</schema>
END
```

Figure 3:
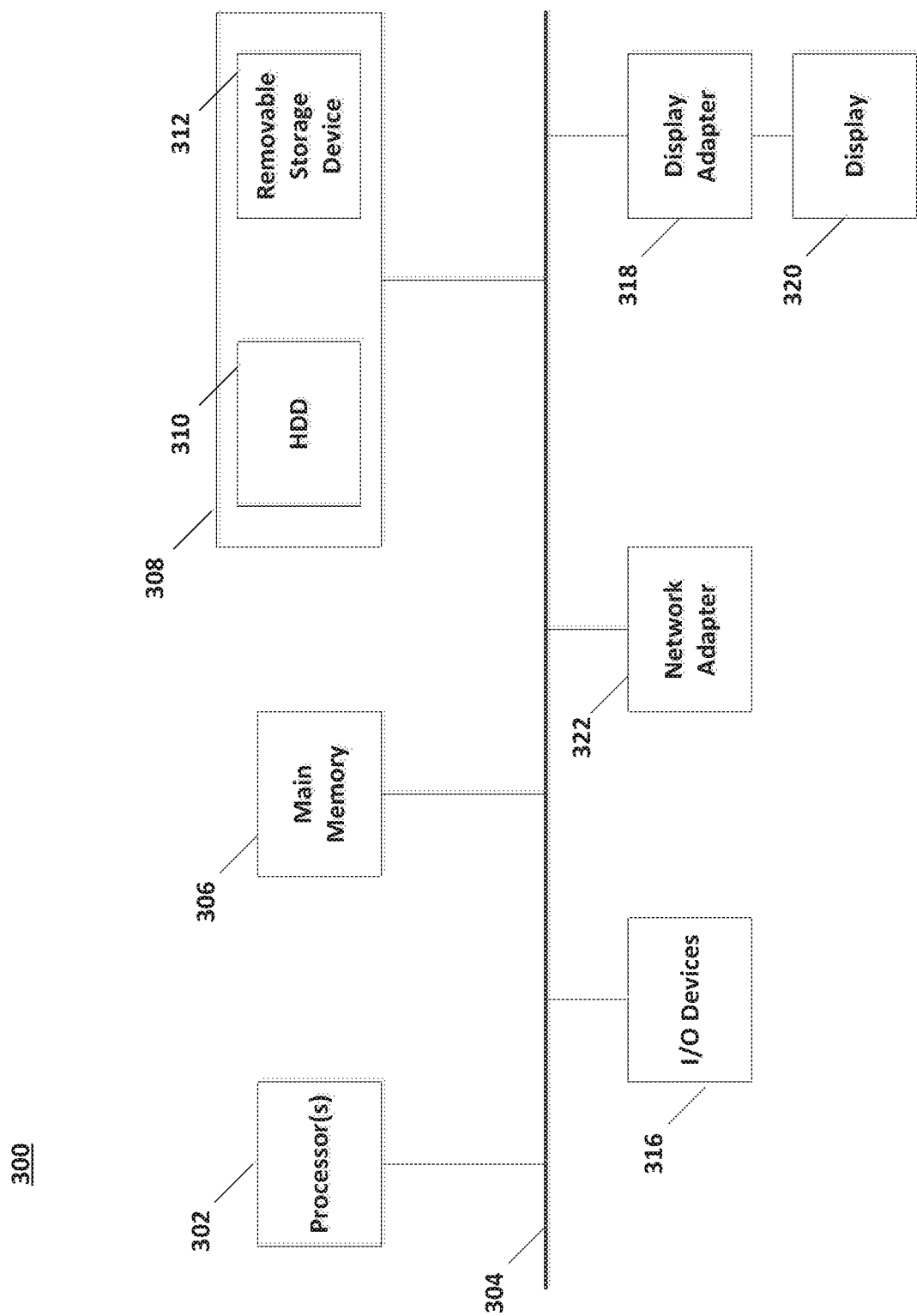
FIG. 3 illustrates an example computer system that is consistent with implementations of the present disclosure.

FIG. 3 illustrates an example computer system 300 that is consistent with implementations of the present disclosure. In general, system 300 may include components, for example, one or more modules to receive a request, over an interface, to perform an action to one or more provisioning objects within a set of provisioning objects. The request can be provided by a client over a provisioning protocol, such as EPP, or can be provided over a UI. One or more modules can be operable to analyze the request and one or more modules can be operable to perform the action based on the analyzing. In some implementations, the one or more provisioning objects comprise a domain, a host, a contact, or combinations thereof. In some implementations, the action comprises a transform operation, wherein the transform operation comprises a create action, an update action, a delete action, a renew action, and/or a transfer action. In some implementations, the transform operation can modify more than one of the one or more provisioning objects at the same time with a single transform operation. In some implementations, the one or more provisioning objects can share one or more attribute in common. In some implementations, one or more modules can be operable to determine that the one or more provisioning objects share one or more attributes in common and one or more modules can be operable to associate together the one or more provisioning objects that were determined to share the one or more attributes in a database.

The one or more modules can be implemented in various computer systems, such as a personal computer, a server, a workstation, an embedded system, a distributed system, a multifunction device, or a combination thereof. The processes described herein can be implemented as a computer program. The computer program can exist in a variety of forms both active and inactive. For example, the computer program can exist as software program(s) comprised of program instructions in source code, object code, executable code or other formats, firmware program(s), or hardware description language (HDL) files. Any of the above can be embodied on a computer readable medium, which include storage devices, in compressed or uncompressed form. Examples of the components that can be included in system 300 will now be described.

As shown, system 300 can include at least one processor 302, input/output devices 316, and may include a keyboard, a pointing device (e.g., a mouse, a touchpad, and the like), a display adapter 319 and display 320, main memory 306, network adapter 322, removable storage device 312, and a storage device 308 including hard disk drive 310 and removable storage device 312. Storage device 308 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. System 300 can also be provided with additional input/output devices, such as a printer (not shown). The various components of system 300 communicate through a system bus 304 or similar architecture. In addition, system 300 can include an operating system (OS) that resides in memory 306 during operation. One skilled in the art will recognize that system 300 can include multiple processors. For example, system 300 can include multiple copies of the same processor. Alternatively, system 300 can include a heterogeneous mix of various types of processors. For example, system 300 can use one processor as a primary processor and other processors as co-processors. For another example, system 300 can include one or more multi-core processors and one or more single core processors. Thus, system 300 can include any number of execution cores across a set of processors. One skilled in the art will also recognize that other components and peripherals can be included in system 300.

Main memory 106 serves as a primary storage area of system 300 and holds data that is actively used by applications running on processor 302. One skilled in the art will recognize that applications are software programs that each contains a set of computer instructions for instructing system 300 to perform a set of specific tasks during runtime, and that the term "applications" can be used interchangeably with application software, application programs, device drivers, and/or programs in accordance with embodiments of the present teachings. Memory 306 can be implemented as a random access memory or other forms of memory as described below, which are well known to those skilled in the art.

OS is an integrated collection of routines and instructions that are responsible for the direct control and management of hardware in system 300 and system operations. Additionally, OS provides a foundation upon which to run application software and device drivers. For example, OS can perform services, such as resource allocation, scheduling, input/output control, and memory management. OS can be predominantly software, but can also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor (e.g., processor 302), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

In accordance with the present disclosure, the ability to manage multiple (two or more) provisioned DNS registry objects in a single transaction using the multiple domain EPP command structure, as described above, can allow for greater efficiencies of communication with the registry over low-bandwidth networks. Instead of requiring a registrar to issues multiple EPP commands for single registry objects, the ability to manage multiple provisioned DNS registry objects together as presently described can have cost savings to both the registrar that issues the commands and the registry that processes the commands.

Resources described as singular or integrated can in one embodiment be plural or distributed, and resources described as multiple or distributed can in embodiments be combined.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A computer-implemented method for managing multiple provisioned domain name system ("DNS") registry objects, the method comprising:
   receiving from a registrar, at a DNS registry, a multiple domain extensible provisioning protocol ("EPP") command to synchronize expiration dates of the multiple provisioned DNS registry objects;
   comparing the command to synchronize expiration dates with one or more allowable actions in a policy maintained by the registry;
   determining that the action is allowable based on the comparing; and
   synchronizing, based on the determining, expiration dates for each of the multiple provisioned DNS registry objects in one transaction.

2. The method of claim 1, further comprising receiving, at a DNS registry, a first multiple domain EPP command from a registrar to group the multiple provisioned DNS registry objects to be managed together.

3. The method of claim 1, wherein the policy comprises a domain lifecycle policy.

4. The method of claim 1, wherein the multiple domain EPP command to synchronize expiration dates comprises one of: a multiple domain create operation to create an instance of each DNS registry object, a multiple domain transfer operation to manage sponsorship changes of each DNS registry object, or a multiple domain renew operation to extend a validity period of each DNS registry object.

5. The method of claim 1, wherein the multiple domain EPP command to synchronize expiration dates comprises an extension of an existing EPP command.

6. The method of claim 1, wherein each of the multiple provisioned DNS registry objects comprise an A DNS resource record.

7. The method of claim 1, wherein a first of the multiple provisioned DNS registry objects is an international language version of a second of the multiple provisioned DNS registry objects.

8. The method of claim 1, wherein the multiple provisioned DNS registry objects have a common top-level domain.

9. The method of claim 1, wherein the multiple provisioned DNS registry objects lack a common top-level domain.

10. The method of claim 1, wherein the receiving from a registrar comprises receiving from a registrar on behalf of a registrant.

11. A system comprising:
    a processor; and
    a memory communicatively coupled to the processor, the memory storing instructions which, when executed on the processor, perform a method for managing multiple provisioned domain name system ("DNS") registry objects, the method comprising:

receiving from a registrar, at a DNS registry, a multiple domain extensible provisioning protocol ("EPP") command to synchronize expiration dates of the multiple provisioned DNS registry objects;

comparing the command to synchronize expiration dates with one or more allowable actions in a policy maintained by the registry;

determining that the action is allowable based on the comparing; and synchronizing, based on the determining, expiration dates for each of the multiple provisioned DNS registry objects in one transaction.

12. The system of claim 11, wherein the method further comprises receiving, at a DNS registry, a first multiple domain EPP command from a registrar to group the multiple provisioned DNS registry objects to be managed together.

13. The system of claim 11, wherein the policy comprises a domain lifecycle policy.

14. The system of claim 11, wherein the multiple domain EPP command to synchronize expiration dates comprises one of: a multiple domain create operation to create an instance of each DNS registry object, a multiple domain transfer operation to manage sponsorship changes of each DNS registry object, or a multiple domain renew operation to extend a validity period of each DNS registry object.

15. The system of claim 11, wherein the multiple domain EPP command to synchronize expiration dates comprises an extension of an existing EPP command.

16. The system of claim 11, wherein each of the multiple provisioned DNS registry objects comprise an A DNS resource record.

17. The system of claim 11, wherein a first of the multiple provisioned DNS registry objects is an international language version of a second of the multiple provisioned DNS registry objects.

18. The system of claim 11, wherein the multiple provisioned DNS registry objects have a common top-level domain.

19. The system of claim 11, wherein the multiple provisioned DNS registry objects lack a common top-level domain.

20. The system of claim 11, wherein the receiving from a registrar comprises receiving from a registrar on behalf of a registrant.

* * * * *